(12) United States Patent
Yuuki et al.

(10) Patent No.: US 10,473,966 B2
(45) Date of Patent: Nov. 12, 2019

(54) DISPLAY DEVICE

(71) Applicant: Panasonic Intellectual Property Management Co., Ltd., Osaka (JP)

(72) Inventors: Kouzou Yuuki, Osaka (JP); Junichi Nonaka, Osaka (JP); Kosuke Kubota, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/977,342

(22) Filed: May 11, 2018

(65) Prior Publication Data

US 2018/0259807 A1 Sep. 13, 2018

Related U.S. Application Data

(63) Continuation of application No. PCT/JP2017/001879, filed on Jan. 20, 2017.

(30) Foreign Application Priority Data

Mar. 8, 2016 (JP) .................................. 2016-045029

(51) Int. Cl.
*G02F 1/133* (2006.01)
*G02F 1/1333* (2006.01)
(Continued)

(52) U.S. Cl.
CPC ........ *G02F 1/133385* (2013.01); *B60K 35/00* (2013.01); *G02B 27/0101* (2013.01);
(Continued)

(58) Field of Classification Search
None
See application file for complete search history.

(56) References Cited

U.S. PATENT DOCUMENTS 5,835,179 A * 11/1998 Yamanaka ........ G02F 1/133385
349/161
6,414,781 B1 * 7/2002 Saitoh ............... G02F 1/133308
349/149
(Continued)

FOREIGN PATENT DOCUMENTS

JP 2000-131682 5/2000
JP 2004-198933 7/2004
(Continued)

OTHER PUBLICATIONS

International Search Report of PCT application No. PCT/JP2017/001879 dated Mar. 7, 2017.

*Primary Examiner* — James A Dudek
(74) *Attorney, Agent, or Firm* — Greenblum & Bernstein, P.L.C.

(57) ABSTRACT

A display device includes a light source, an optical system, a liquid crystal panel, and a first heat sink. The optical system converts light emitted from the light source into irradiation light that is to be an irradiation area having a predetermined width. The liquid crystal panel receives the irradiation light. The first heat sink includes an opening through which the irradiation light passes, and supports the liquid crystal panel. The first heat sink is in contact with the liquid crystal panel.

12 Claims, 7 Drawing Sheets

(51) Int. Cl.
  *B60K 35/00* (2006.01)
  *G02B 27/01* (2006.01)
  *G02F 1/1335* (2006.01)

(52) U.S. Cl.
  CPC .. *G02F 1/133308* (2013.01); *G02F 1/133603* (2013.01); *G02F 1/133606* (2013.01); *B60K 2370/155* (2019.05); *B60K 2370/334* (2019.05); *G02F 2001/133628* (2013.01)

(56) References Cited

U.S. PATENT DOCUMENTS

| | | | | |
|---|---|---|---|---|
| 7,093,960 | B2* | 8/2006 | Kojima | G02F 1/133308 348/E9.027 |
| 7,218,373 | B2* | 5/2007 | Kojima | G02F 1/133308 349/161 |
| 7,245,334 | B2* | 7/2007 | Miyashita | G02F 1/133308 348/E5.141 |
| 7,289,172 | B2* | 10/2007 | Kojima | H04N 9/3144 348/E9.027 |
| 8,351,208 | B2* | 1/2013 | Hirabayashi | G02F 1/133382 165/104.33 |
| 9,237,299 | B2* | 1/2016 | Yoon | H04N 5/64 |
| 2004/0136146 | A1* | 7/2004 | Saitoh | G02F 1/133308 361/600 |
| 2009/0096957 | A1* | 4/2009 | Hiyama | G02B 6/003 349/65 |
| 2010/0271782 | A1* | 10/2010 | Miyashita | G03B 21/16 361/707 |
| 2012/0300486 | A1* | 11/2012 | Matsushita | G02B 27/01 362/521 |
| 2016/0291397 | A1* | 10/2016 | Pyo | G02F 1/133308 |
| 2018/0156968 | A1* | 6/2018 | Yoo | G02B 6/0085 |
| 2018/0259807 | A1* | 9/2018 | Yuuki | G02F 1/133606 |

FOREIGN PATENT DOCUMENTS

| | | |
|---|---|---|
| JP | 2005-077979 | 3/2005 |
| JP | 2010-079169 | 4/2010 |
| JP | 2011-165624 | 8/2011 |
| JP | 2013-174855 | 9/2013 |
| JP | 2016-031457 | 3/2016 |

* cited by examiner

DISPLAY DEVICE

TECHNICAL FIELD

The present disclosure relates to a display device having a configuration in consideration of an influence of heat to a liquid crystal panel.

BACKGROUND ART

As a display device for displaying an image, a vehicular display device having a liquid crystal panel (for example, head up display (HUD)) is known (refer to, for example, PTL 1 and PTL 2). In PTL 1, a heat sink is provided at a light source to reduce an influence exerted by heat from the light source. In PTL 2, light having amplitude other than a predetermined direction in sunlight is blocked by providing a polarizing member to reduce an influence exerted by heat radiated from the sun.

CITATION LIST

Patent Literature

PTL 1: Unexamined Japanese Patent Publication No. 2011-165624
PTL 2: Unexamined Japanese Patent Publication No. 2000-131682

SUMMARY OF THE INVENTION

A display device according to an aspect of the present disclosure includes a light source, an optical system, a liquid crystal panel, and a first heat sink. The optical system converts light emitted from the light source into irradiation light that is to be an irradiation area having a predetermined width. The liquid crystal panel receives the irradiation light. The first heat sink includes an opening through which the irradiation light passes, and supports the liquid crystal panel. The first heat sink is in contact with the liquid crystal panel.

The display device of the present disclosure can sufficiently reduce an influence of heat to the liquid crystal panel.

DESCRIPTION OF EMBODIMENT

Figure 1:
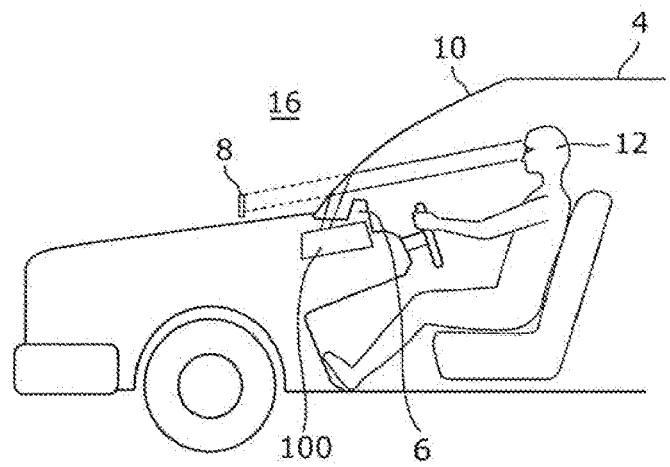
FIG. 1 is a view illustrating a usage example of a display device according to the present exemplary embodiment.

Prior to description of an exemplary embodiment of the present disclosure, problems found in conventional display devices will be briefly described herein. In techniques of PTL 1 and PTL 2, there is a problem in that an influence of heat to a liquid crystal panel cannot be sufficiently reduced. The present disclosure therefore provides a display device capable of sufficiently reducing an influence of heat to a liquid crystal panel.

Findings Underlying the Present Disclosure

The inventors of the present application have found that the following problems arise in the display devices described in the section of "BACKGROUND ART".

In a vehicular display device in PTL 1, a heat sink for radiating heat generated by a light source (light emitting diode (LED)) for irradiating a rear surface side of a display to form an image is provided on a circuit board mounted with the LED.

The liquid crystal panel receives an influence of heat generated by the light source and an influence of heat caused by light emitted from the light source. However, the technique in PTL 1 cannot sufficiently reduce the influence of heat generated by the light source and the influence of the heat caused by the light emitted from the light source.

In a display device in PTL 2, a reflective polarizing film is disposed above liquid crystal cells (liquid crystal panel). With this configuration, the reflective polarizing film reflects light other than light including wavelengths along a predetermined direction in sunlight, thereby reducing an influence of heat radiated from the sun, which influences the liquid crystal panel.

However, although the technique in PTL 2 can reduce the heat radiated from the sun, heat caused by the light in the predetermined direction in sunlight, which cannot be reduced, may be accumulated in the liquid crystal panel. That is, the technique in PTL 2 cannot sufficiently reduce the influence of heat to the liquid crystal panel.

Further, for example, a head up display is required to display a video even when the head up display is exposed to the sunlight. Therefore, the head up display is required to further increase brightness and output power of a light source. However, the increase in brightness and output power causes an increase in heat and light generated by the light source, and an influence of heat to the liquid crystal panel cannot be sufficiently reduced. Accordingly it is difficult to further increase the brightness and output power of the light source.

Hereinafter, a display device that can sufficiently reduce an influence of heat to a liquid crystal panel will be described.

A display device according to an aspect of the present disclosure includes a light source, an optical system, a liquid crystal panel, and a first heat sink. The optical system converts light emitted from the light source into irradiation light that is to be an irradiation area having a predetermined width. The liquid crystal panel receives the irradiation light. The first heat sink includes an opening through which the irradiation light passes, and supports the liquid crystal panel. The first heat sink is in contact with the liquid crystal panel.

The first heat sink is configured to include an opening through which light from the light source passes, and a portion in the liquid crystal panel excluding an effective display area that is irradiated with light by the light source is in contact with the first heat sink. Therefore, a portion that does not contribute to display in the liquid crystal panel can release heat through the first heat sink, thereby efficiently releasing heat in the liquid crystal panel to the outside. Thus, the influence of heat to the liquid crystal panel can be sufficiently reduced.

The display device further includes a diffusion plate that diffuses the irradiation light, and the first heat sink may include a first surface that is in contact with the liquid crystal panel, and a second surface that is formed at a position closer to the opening than the first surface is when viewed from a display surface side of the liquid crystal panel. The second surface may be formed at a position recessed in a direction separating from the liquid crystal panel. The diffusion plate may be disposed between the second surface and the liquid crystal panel.

According to this configuration, the diffusion plate that is disposed adjacent to a light source side of the liquid crystal panel can be housed between the liquid crystal panel and the second surface of the first heat sink. Therefore, even when the diffusion plate is provided on the light source side of the liquid crystal panel, a state in which the liquid crystal panel and the first surface of the first heat sink are in plane contact with each other can be maintained. Accordingly, the first heat sink can efficiently release heat in the liquid crystal panel.

Furthermore, the display device may include a pressing member that presses the liquid crystal panel from a display surface side of the liquid crystal panel, and the first heat sink may protrude from the pressing member when viewed from the display surface side.

Therefore, it is possible to reduce heat radiated from the first heat sink from being blocked by the pressing member to the utmost. Accordingly, the first heat sink can efficiently release heat in the liquid crystal panel.

Furthermore, the first heat sink may include a first heat radiation fin.

In this manner, the first heat sink can increase a heat amount that is radiated by heat transfer from the first heat sink to an external space.

Furthermore, the display device further includes a second heat sink that radiates heat generated by the light source and a retaining member that is provided between the first heat sink and the second heat sink and retains the optical system and the light source. The retaining member may be formed of a material having thermal conductivity smaller than thermal conductivity of a material forming the first heat sink and the second heat sink.

With this configuration, the retaining member that is formed of the material having smaller thermal conductivity than that of the material forming the first heat sink and the second heat sink is disposed between the first heat sink and the second heat sink. Accordingly, the retaining member can suppress heat released from the second heat sink to be conducted to the first heat sink. Thus, the first heat sink can efficiently release heat in the liquid crystal panel.

Furthermore, the retaining member may include a cover that covers an end close to the second heat sink of the first heat sink.

Accordingly, the retaining member can effectively suppress conduction of heat released from the second heat sink to the first heat sink.

Furthermore, the first heat sink may include a first heat radiation fin, the second heat sink may include a second heat radiation fin, and a first plane parallel to a direction in which the first heat radiation fin extends and a second plane parallel to a direction in which the second heat radiation fin extends may intersect with each other.

With this configuration, the first heat radiation fin of the first heat sink and the second heat radiation fin of the second heat sink are respectively parallel to the planes that intersect with each other. In other words, air heated by the second heat radiation fin of the second heat sink can be moved along the second heat radiation fin. This configuration allows the air to easily move to a portion excluding a portion where the first heat radiation fin is disposed. Accordingly, conduction of the heat released from the second heat sink to the first heat sink can be effectively suppressed.

The display device may further include a first mirror, a second mirror, and a housing that accommodates the first mirror and the second mirror, wherein the first heat sink may be disposed so as to be exposed to an outside of the housing.

With this configuration, the first heat sink is disposed so as to be exposed to the outside of the housing, thereby efficiently releasing heat in the liquid crystal panel.

Hereinafter, the exemplary embodiment will be specifically described with reference to the drawings. Note that the exemplary embodiment described below illustrates a specific example of the present disclosure. Numerical values, shapes, materials, structural elements, arrangement positions and connection modes of the structural elements, steps, order of the steps, and the like illustrated in the following exemplary embodiment are merely examples, and therefore are not intended to limit the present disclosure. Furthermore, among structural elements in the following exemplary embodiment, structural elements not recited in the independent claim indicating the broadest concept are described as arbitrary structural elements.

Exemplary Embodiment

[1. Usage Example of Display Device]

Figure 2:
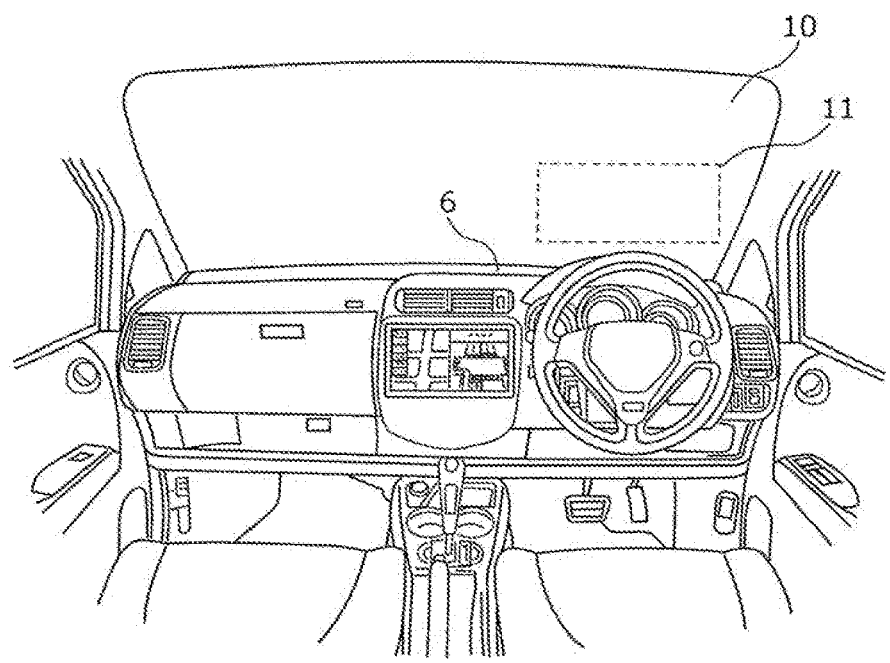
FIG. 2 is a view illustrating an area of an image displayed by the display device according to the present exemplary embodiment.

With reference to FIGS. 1 and 2, a usage example and a schematic configuration of display device 100 according to the present exemplary embodiment will be described first. FIG. 1 is a view illustrating a usage example of a display device according to the present exemplary embodiment. FIG. 2 is a view illustrating a display area of an image displayed by the display device according to the present exemplary embodiment.

As illustrated in FIG. 1, display device 100 according to the present exemplary embodiment is disposed on, for example, dashboard 6 of automobile 4 (an example of a vehicle). Note that windshield 10 is disposed above dashboard 6 of automobile 4. Windshield 10 is a glass arranged in front of a driver and is formed of translucent glass.

As illustrated in FIGS. 1 and 2, in display device 100, light representing image 8 that is a virtual image is projected toward display area 11 at a lower part in windshield 10 close to a driver sheet, for example. With this configuration, the light is reflected at display area 11 in windshield 10 toward driver 12 (an example of a user). Then, image 8 that is a virtual image is displayed in display area 11 and is also displayed in space 16 in front of windshield 10, when viewed from driver 12. Such display allows driver 12 to view image 8 that is a virtual image superimposed on a scene in front of windshield 10.

[2. Configuration of Display Device]

Figure 3:
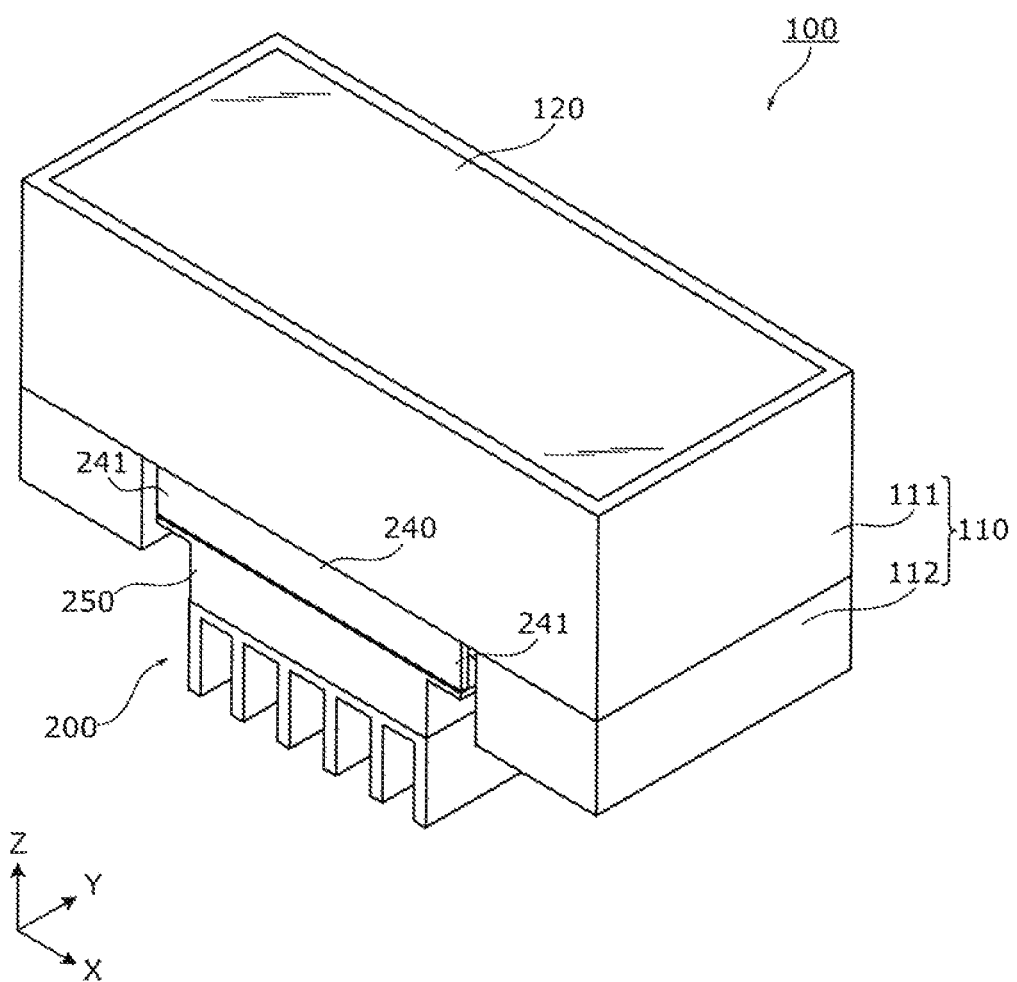
FIG. 3 is a perspective view illustrating an external appearance of the display device according to the present exemplary embodiment.
Figure 4:
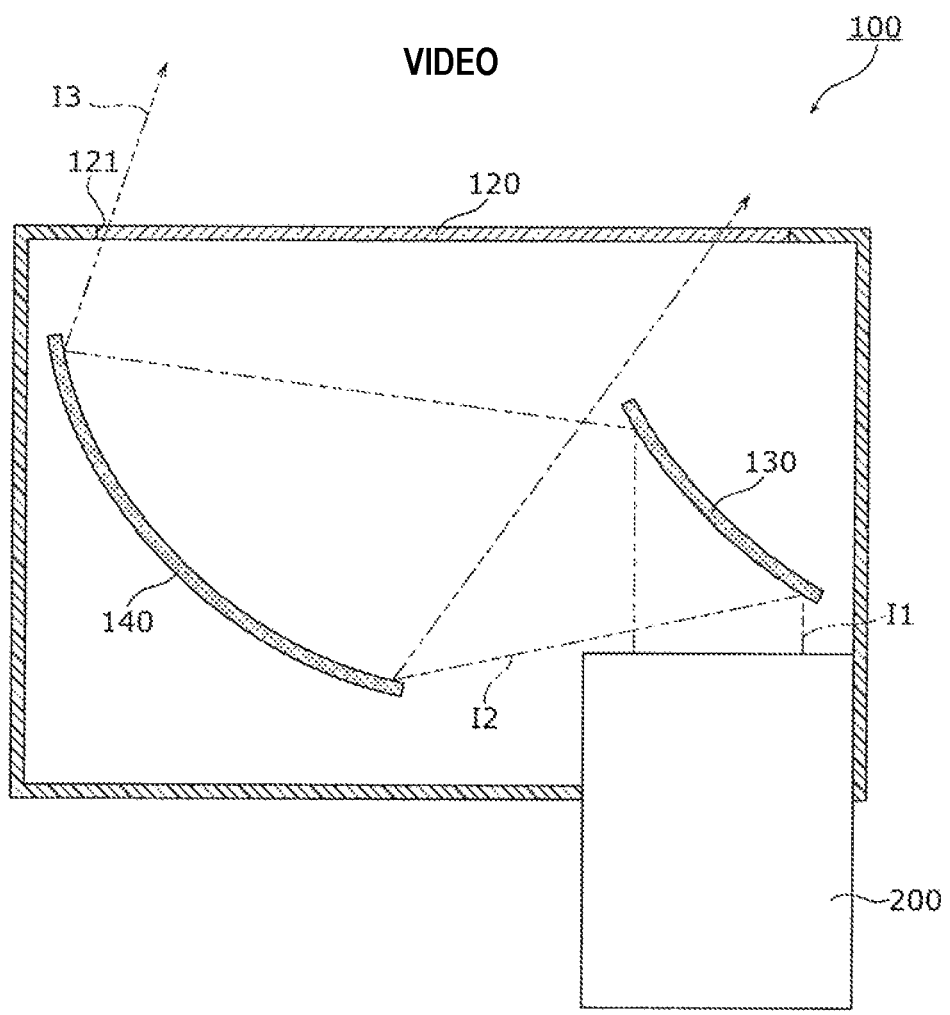
FIG. 4 is a schematic cross-sectional view illustrating a configuration of the display device according to the present exemplary embodiment.

Next, with reference to FIGS. 3 and 4, a configuration of display device 100 according to the present exemplary embodiment will be described. FIG. 3 is a perspective view illustrating an external appearance of the display device according to the present exemplary embodiment. FIG. 4 is a schematic cross-sectional view illustrating the configuration of the display device according to the present exemplary embodiment. Note that, in FIG. 3 and subsequent figures, a Z-axis direction denotes a travelling direction of light emitted by a light source included in liquid crystal module 200, an X-axis direction denotes a direction perpendicular to the Z-axis direction, and a Y-axis direction denotes a direction perpendicular to the Z-axis direction and the X-axis direction. Further, the X-axis direction corresponds to a lateral direction (horizontal direction) of an image formed by a liquid crystal panel of liquid crystal module 200, and the Y-axis direction corresponds to a longitudinal direction (vertical direction) of the image formed by the liquid crystal panel of liquid crystal module 200.

As illustrated in FIGS. 3 and 4, display device 100 includes housing 110, first mirror 130, second mirror 140, transparent cover 120, and liquid crystal module 200.

Housing 110 includes upper cover 111 and lower cover 112. Upper cover 111 is provided with opening 121 at an upper part of upper cover 111. Lower cover 112 forms an internal space in housing 110 together with upper cover 111. Transparent cover 120 is fit into opening 121 of upper cover 111. In other words, opening 121 is closed with transparent cover 120. Liquid crystal module 200 is attached at a lower end of lower cover 112. Housing 110 accommodates first mirror 130, second mirror 140, and a part of liquid crystal module 200.

First mirror 130 reflects video I1 projected by liquid crystal module 200. Second mirror 140 reflects video I2 that is video I1 reflected by first mirror 130, and projects video I3 to which first mirror 140 reflects to the outside of display device 100 through opening 121. Specifically, video I3 is projected on windshield 10.

Liquid crystal module 200 is a video projection device (display device) that projects a video by irradiating the liquid crystal panel with light from the light source.

[3. Configuration of Liquid Crystal Module]

Figure 5:
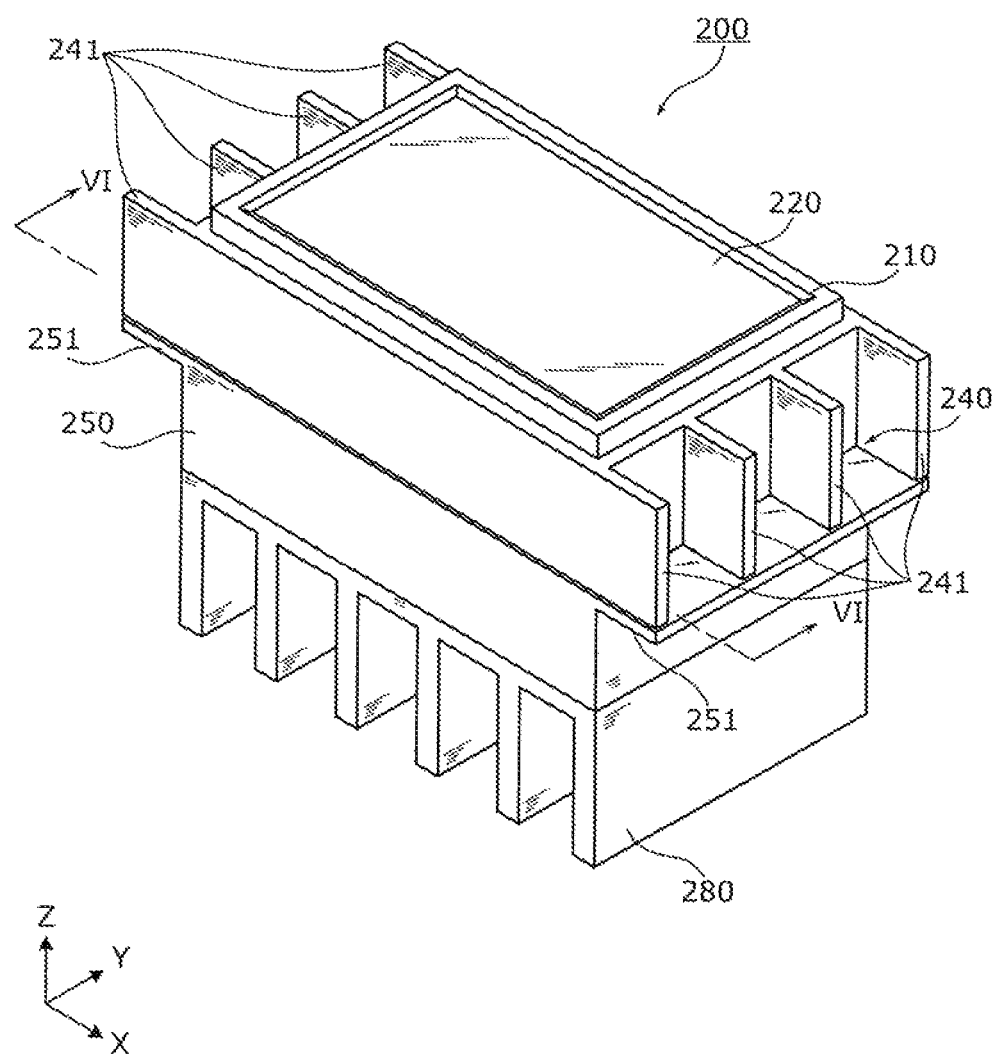
FIG. 5 is a perspective view of an external appearance of a liquid crystal module according to the present exemplary embodiment.
Figure 6:
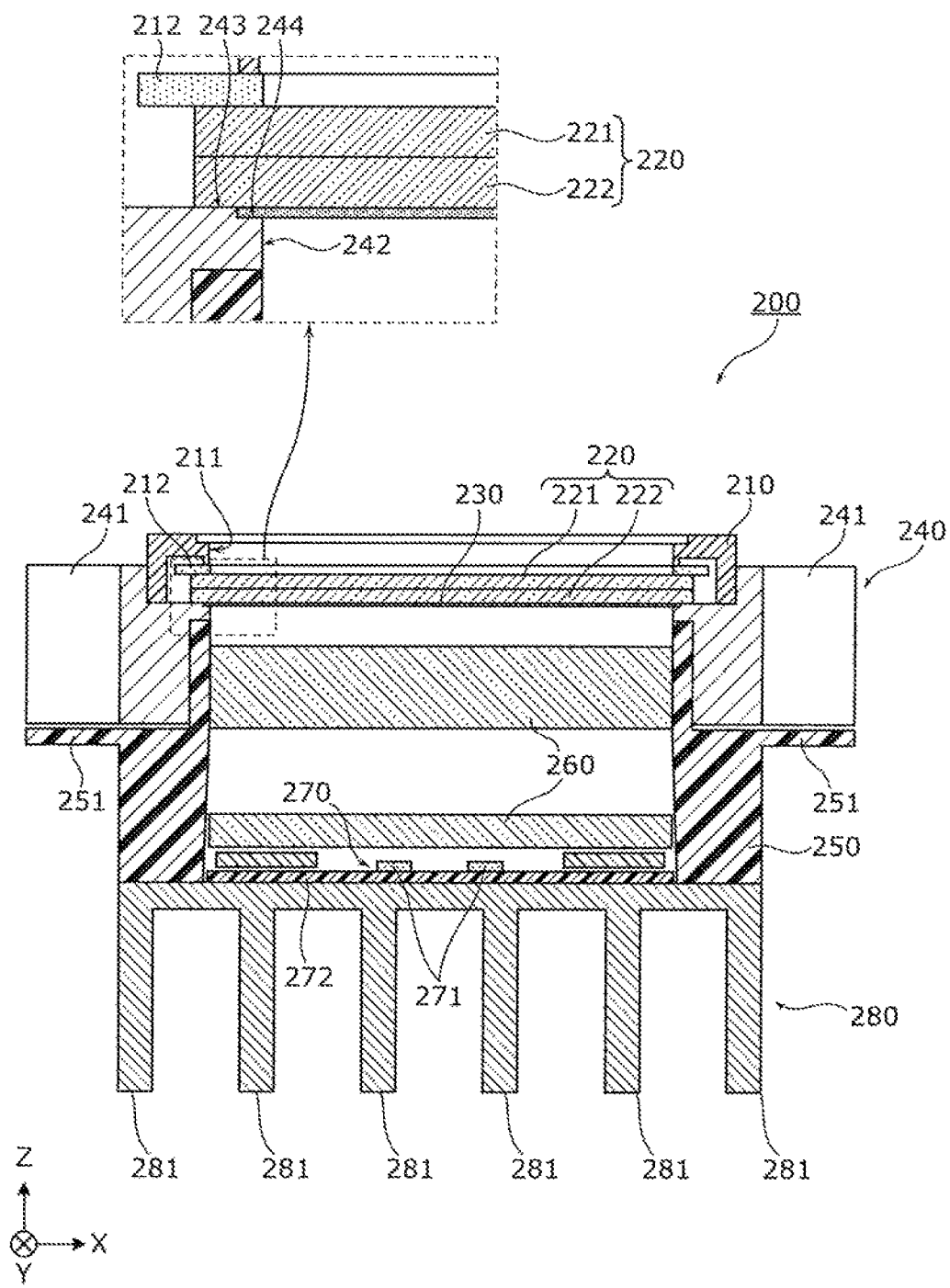
FIG. 6 is a view illustrating a cross section of the liquid crystal module taken along line VI-VI in FIG. 5.

Next, with reference to FIGS. 5 and 6, a configuration of liquid crystal module 200 will be described. FIG. 5 is a perspective view of an external appearance of the liquid crystal module according to the present exemplary embodiment. FIG. 6 is a view of a cross section of the liquid crystal module taken along line VI-VI in FIG. 5.

As illustrated in FIGS. 5 and 6, liquid crystal module 200 includes pressing member 210, liquid crystal panel 220, diffusion plate 230, first heat sink 240, retaining member 250, optical system 260, light source 270, and second heat sink 280. Liquid crystal module 200 may not include pressing member 210. Liquid crystal module 200 may not include diffusion plate 230. Further, liquid crystal module 200 may not include retaining member 250 and second heat sink 280.

Pressing member 210 presses liquid crystal panel 220 from a display surface side of liquid crystal panel 220 (a positive side in the Z-axis direction). Specifically, pressing member 210 is a rectangular plate-shaped member provided with rectangular opening 211, and presses a portion of liquid crystal panel 220 excluding an effective display area. Pressing member 210 may press liquid crystal panel 220 through cushion member 212. Cushion member 212 is disposed between pressing member 210 and an outer periphery of liquid crystal panel 220. Pressing member 210 is formed of a resin, for example.

Liquid crystal panel 220 includes a plurality of liquid crystal elements arranged in an array, panel body 221, and glass plate 222. In panel body 221, the plurality of liquid crystal elements are driven by a drive circuit (not illustrated) to control brightness of each pixel based on an input video signal. Panel body 221 and glass plate 222 are in plane contact with each other. Glass plate 222 is disposed on a light source 270 close to panel body 221 (a rear surface side, a negative side in the Z-axis direction). In a state in which the brightness of each pixel is controlled by the drive circuit, liquid crystal panel 220 receives light from light source 270, which is converted by optical system 260, to form a video. Liquid crystal panel 220 may not include glass plate 222.

Diffusion plate 230 is an optical sheet for diffusing the light from light source 270, which is converted by optical system 260. Diffusion plate 230 is, for example, a sheet-shaped member that has translucence in a milky-white color, and is formed of vinyl chloride.

First heat sink 240 is a heat radiating member that is in contact with the outer periphery of liquid crystal panel 220 and radiates heat in liquid crystal panel 220 to the outside. First heat sink 240 is in contact with, for example, portions constituting four sides of the outer periphery of liquid crystal panel 220. First heat sink 240 is formed of metal such as aluminum, aluminum alloy, copper, or copper alloy. First heat sink 240 includes opening 242 through which the light from light source 270, which is converted by optical system 260, passes without being blocked. Opening 242 is in contact with the outer periphery of liquid crystal panel 220 to support liquid crystal panel 220. Opening 242 includes portions constituting four sides corresponding to the four sides of the outer periphery of liquid crystal panel 220, and the portions constituting the four sides are in contact with portions constituting the four sides of the outer periphery of liquid crystal panel 220. That is, opening 242 is a through-hole surrounded by the four sides.

First heat sink 240 protrudes from pressing member 210 when viewed from a display surface side of liquid crystal panel 220 (the positive side in the Z-axis direction). Therefore, it is possible to reduce heat radiated from first heat sink 240 from being blocked by pressing member 210 to the utmost. Accordingly, first heat sink 240 can efficiently release heat in liquid crystal panel 220.

Further, first heat sink 240 includes a plurality of first heat radiation fins 241 each having a flat-plate shape parallel to the Z-axis direction and which extend toward outer sides in the X-axis direction at end parts on both sides in the X-axis direction. That is, the plurality of first heat radiation fins 241 are parallel to a first plane that is an X-Z plane. In this manner, first heat sink 240 includes the plurality of first heat radiation fins 241, thereby increasing a heat amount that is radiated by heat transfer from first heat sink 240 to the external space.

Retaining member 250 retains optical system 260 and light source 270. Specifically, retaining member 250 is a substantially box-shaped member forming an internal space whose upper part is opened, and supports light source 270 and the second heat sink at a bottom part of retaining member 250. Further, retaining member 250 retains a plurality of lenses constituting optical system 260 at a position above light source 270 inside the internal space. In other words, retaining member 250 constitutes a backlight of liquid crystal module 200 together with optical system 260 and light source 270. Retaining member 250 is, for example, formed of resin.

Optical system 260 is a member that converts the light emitted from light source 270 into light (irradiation light) having a predetermined width (a width of an irradiation area). Specifically, optical system 260 is an optical member that converts the light emitted from light source 270 into the light (irradiation light) to be the irradiation area having a width of a size corresponding to the effective display area of liquid crystal panel 220, and is configured by a plurality of lenses. Optical system 260 is formed of a transparent resin such as acryl.

For example, light source 270 is configured by light emitting diode (LED) 271 mounted on substrate 272. Light source 270 includes a plurality of LEDs 271.

Second heat sink 280 is a heat radiation member that radiates heat generated by light source 270. Specifically, second heat sink 280 is disposed so as to be in contact with a rear surface of substrate 272 of light source 270. Second heat sink 280 is formed of metal such as aluminum, aluminum alloy, copper, or copper alloy.

Further, second heat sink 280 includes a plurality of second heat radiation fins 281 each having a flat-plate shape parallel to the Y-axis direction and which extend toward a side (a negative side in the Z-axis direction) opposite to a side on which light source 270 is disposed. That is, the plurality of second heat radiation fins 281 are parallel to a second plane that is a Y-Z plane.

Figure 7:
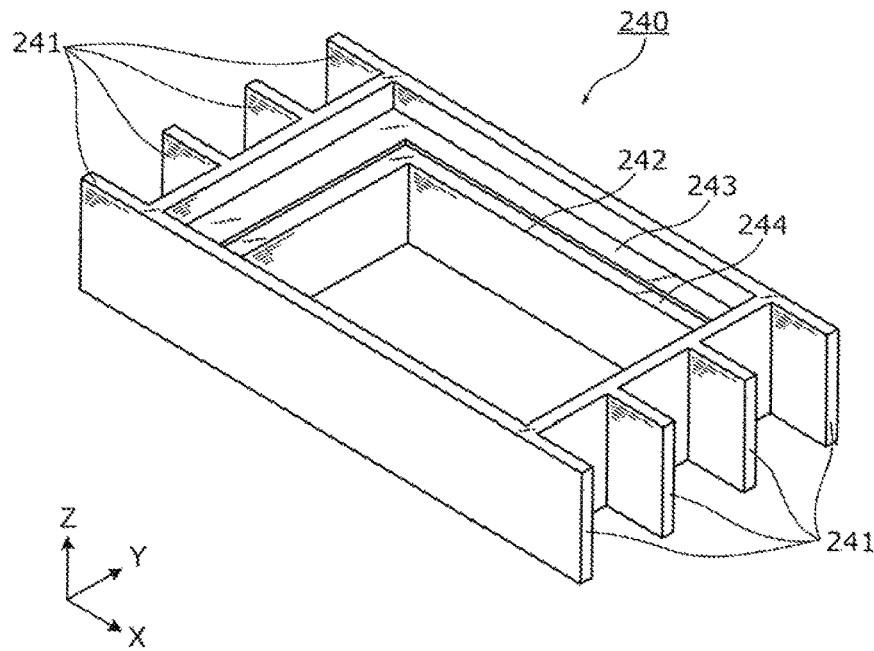
FIG. 7 is a perspective view of an external appearance of a first heat sink according to the present exemplary embodiment.
Figure 8A:
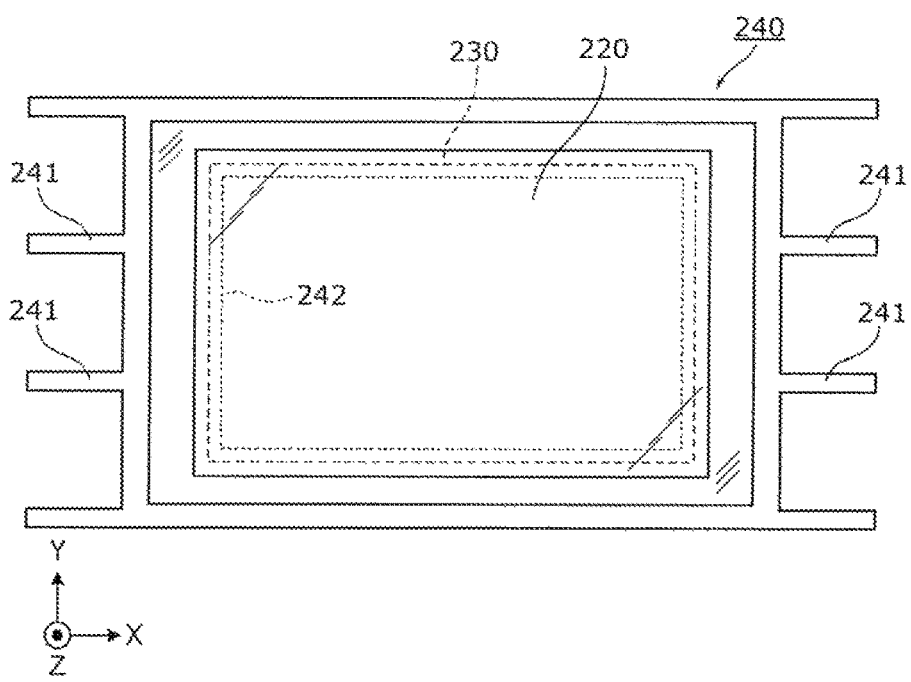
FIG. 8A is a view of the first heat sink in a state in which a liquid crystal panel and a diffusion plate according to the present exemplary embodiment are disposed, as viewed from a display surface side of a liquid crystal panel.
Figure 8B:
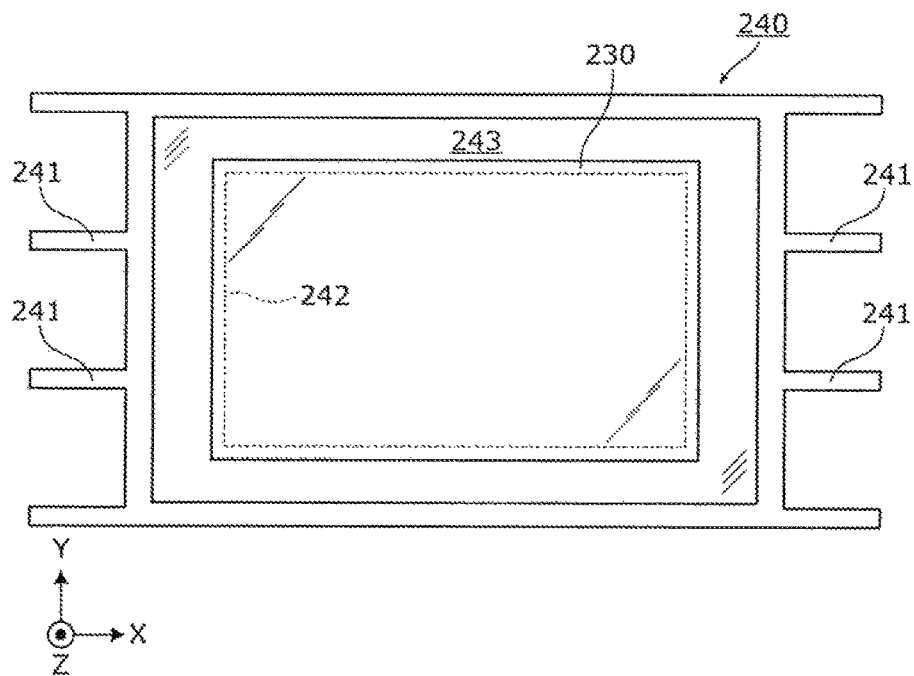
FIG. 8B is a view of the first heat sink in a state in which only the diffusion plate according to the present exemplary embodiment is disposed, as viewed from the display surface side of the liquid crystal panel.
Figure 8C:
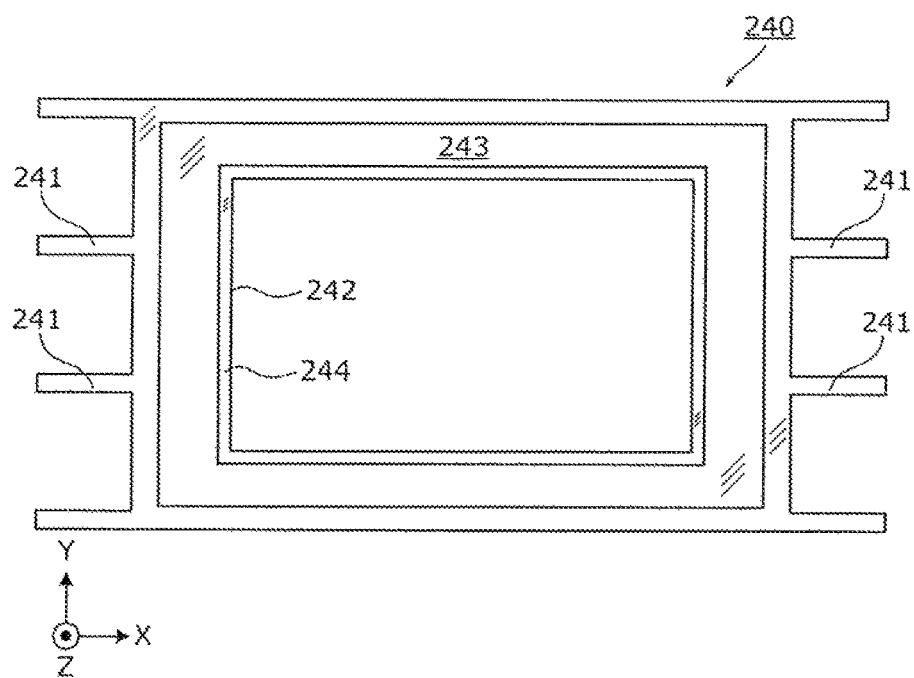
FIG. 8C is a view of the first heat sink in a state in which the liquid crystal panel and the diffusion plate according to the present exemplary embodiment are removed, as viewed from the display surface side of the liquid crystal panel.

Next, with reference to FIG. 6, FIG. 7, and FIGS. 8A to 8C, a positional relationship between liquid crystal panel 220, diffusion plate 230, and first heat sink 240 will be described. FIG. 7 is a perspective view of an external appearance of the first heat sink according to the present exemplary embodiment. FIG. 8A is a view of the first heat sink in a state in which the liquid crystal panel and the diffusion plate according to the present exemplary embodiment are disposed, as viewed from a display surface side of the liquid crystal panel. FIG. 8B is a view of the first heat sink in a state in which only the diffusion plate according to the present exemplary embodiment is disposed, as viewed from the display surface side of the liquid crystal panel. FIG. 8C is a view of the first heat sink in a state in which the liquid crystal panel and the diffusion plate according to the present exemplary embodiment are removed, as viewed from the display surface side of the liquid crystal panel.

As illustrated in FIG. 6, FIG. 7, and FIGS. 8A to 8C, first heat sink 240 includes second surface 244 formed at a position recessed to a side opposite to liquid crystal panel 220 (the negative side of the Z-axis direction). That is, second surface 244 is formed at a position recessed in a direction separating from liquid crystal panel 220. Further, second surface 244 is formed on closer to an opening 242 side than first surface 243 that is in contact with liquid crystal panel 220 (a position closer to opening 242 than first surface 243 is), when viewed from the display surface side of liquid crystal panel 220. In other words, a level difference is formed between first surface 243 and second surface 244. For example, second surface 244 is formed in a region that surrounds a periphery of opening 242, when viewed from the display surface side of liquid crystal panel 220.

Diffusion plate 230 has a shape larger than opening 242 and smaller than an outer periphery of second surface 244, and is disposed so as to be located within second surface 244. Further, a thickness of diffusion plate 230 is not more than the level difference between first surface 243 and second surface 244. That is, diffusion plate 230 is disposed between second surface 244 and liquid crystal panel 220. In other words, the level difference between first surface 243 and second surface 244 is formed over the entire thickness of diffusion plate 230 at a side part of diffusion plate 230.

Accordingly, diffusion plate 230 that is disposed adjacent to the side of light source 270 of liquid crystal panel 220 (the negative side in the Z-axis direction) can be housed between liquid crystal panel 220 and second surface 244 of first heat sink 240. That is, diffusion plate 230 can be disposed at a position excluding a portion between first surface 243 and liquid crystal panel 220. Therefore, even when diffusion plate 230 is provided on the light source 270 side of liquid crystal panel 220, a state in which liquid crystal panel 220 and first surface 243 of first heat sink 240 are in plane contact with each other can be maintained. Accordingly, first heat sink 240 can efficiently release heat in liquid crystal panel 220.

Note that diffusion plate 230 is preferably in contact with liquid crystal panel 220 and second surface 244 of first heat sink 240, in the state in which the outer periphery of liquid crystal panel 220 and first heat sink 240 are in plane contact with each other. However, diffusion plate 230 may be not necessarily in contact with both liquid crystal panel 220 and second surface 244 of first heat sink 240.

Next, with reference to FIGS. 3, 5, and 6, a relationship between housing 110, first heat sink 240, retaining member 250, and second heat sink 280 will be described.

As illustrated in FIG. 3, in a state in which liquid crystal module 200 is disposed at a predetermined position in lower cover 112 of housing 110, first heat sink 240 is disposed so as to be exposed to the outside of lower cover 112 of housing 110. For example, first heat radiation fins 241 formed on the positive and negative sides in the X-axis direction of first heat sink 240 are exposed to the outside of housing 110. Accordingly, first heat sink 240 can efficiently release heat in liquid crystal panel 220.

Further, as illustrated in FIGS. 5 and 6, retaining member 250 is provided between first heat sink 240 and second heat sink 280, and is formed of a material having smaller thermal conductivity than that of a material forming first heat sink 240 and second heat sink 280. That is, retaining member 250 also functions as a heat insulating member capable of suppressing heat exchange due to thermal conduction between first heat sink 240 and second heat sink 280. Accordingly, retaining member 250 can suppress heat released from second heat sink 280 to be conducted to first heat sink 240. Thus, first heat sink 240 can efficiently release heat in liquid crystal panel 220.

Further, retaining member 250 includes covers 251 that cover a lower part of first heat sink 240. Specifically, each of covers 251 is a flange-shaped member extending from an end on a side of first heat sink 240 of retaining member 250 (the positive side in the Z-axis direction) toward the outside, and covers ends close to the second heat radiation fins of first heat radiation fins 241. That is, covers 251 are formed so as to cover an end close to second heat sink 280 of first heat sink 240. Therefore, covers 251 can cause an air flow generated by air that is heated by second heat sink 280 and then moves upward to deviate from first heat sink 240. This configuration can suppress direct contact between the air and first heat sink 240, and can effectively suppress conduction of heat released from second heat sink 280 to first heat sink 240. Thus, first heat sink 240 can efficiently release heat in liquid crystal panel 220.

The first plane parallel to the plurality of first heat radiation fins 241 of first heat sink 240 and the second plane parallel to the plurality of second heat radiation fins 281 of second heat sink 280 intersect with each other.

Therefore, air heated by heat radiated from second heat radiation fins 281 of second heat sink 280 can be moved along second heat radiation fins 281. This configuration allows the air to easily move to a portion excluding a portion where first heat radiation fins 241 are disposed. Specifically, the air heated by second heat radiation fins 281 can be flown in a direction defined by both ends of liquid crystal module 200 in the Y direction in which first heat radiation fins 241 of first heat sink 240 are not disposed. Accordingly, conduction of the heat released from second heat sink 280 to first heat sink 240 can be effectively suppressed.

[4. Effects]

In display device 100 according to the present exemplary embodiment, the portion of liquid crystal panel 220 excluding the effective display area that is irradiated with light by light source 270 is in contact with first heat sink 240. Therefore, a portion that does not contribute to display in liquid crystal panel 220 can radiate heat through first heat sink 240, thereby efficiently releasing heat in liquid crystal panel 220 to the outside. With this configuration, an influence exerted by radiation heat from sunlight and heat from light source 270 that affect liquid crystal panel 220 can be sufficiently reduced. That is, an influence of heat to the liquid crystal panel can be sufficiently reduced.

[5. Modifications]

Display device 100 according to the above-described exemplary embodiment is described as a head up display, but display device 100 is not limited to the head up display. Display device 100 may be a liquid crystal display, a liquid crystal television, a projector, and the like, that include liquid crystal module 200 having the above-described configuration.

In display device 100 according to the present exemplary embodiment, opening 242 of first heat sink 240 is described as a through-hole surrounded by four sides, but opening 242 is not limited thereto. Opening 242 may be a cutout-shaped portion including portions corresponding to three sides of four sides. In other words, first heat sink 240 may not be in contact with portions constituting four sides of the outer periphery of liquid crystal panel 220, and may be in contact with two or three sides of the outer periphery.

The display device according to one or more aspects has been described above based on the exemplary embodiment. However, the present disclosure is not limited to the exemplary embodiment. Configurations in which various variations conceived by those skilled in the art are applied to the present exemplary embodiment, and configurations established by combining components in different exemplary embodiments may also fall within the scope of one or more aspects, without departing from the gist of the present disclosure.

INDUSTRIAL APPLICABILITY

The present disclosure is applicable to, for example, a vehicular head up display device.

REFERENCE MARKS IN THE DRAWINGS 4 automobile
6 dashboard
8 image
10 windshield
11 display area
12 driver
16 space
100 display device
110 housing
111 upper cover
112 lower cover
120 transparent cover
121 opening
130 first mirror
140 second mirror
200 liquid crystal module
210 pressing member
211 opening
212 cushion member
220 liquid crystal panel
221 panel body
222 glass plate
230 diffusion plate
240 first heat sink
241 first heat radiation fin
242 opening
243 first surface
244 second surface
250 retaining member
251 cover
260 optical system
270 light source
271 light emitting diode (LED)
272 substrate
280 second heat sink
281 second heat radiation fin
I1, I2, I3 video

What is claimed is:

1. A display device comprising:
a light source;
an optical system that converts light emitted from the light source into irradiation light that is to be an irradiation area having a predetermined width;
a liquid crystal panel that receives the irradiation light,
a first heat sink that includes an opening through which the irradiation light passes, and supports the liquid crystal panel; and
a diffusion plate that diffuses the irradiation light,
wherein the first heat sink is in contact with the liquid crystal panel,
the first heat sink includes a first surface that is in contact with the liquid crystal panel and a second surface that is formed at a position closer to the opening than the first surface is when viewed from a display surface side of the liquid crystal panel and is formed at a position recessed in a direction separating from the liquid crystal panel, and
the diffusion plate is disposed between the second surface and the liquid crystal panel.

2. The display device according to claim 1, further comprising a pressing member that presses the liquid crystal panel from the display surface side of the liquid crystal panel,
wherein the first heat sink protrudes from the pressing member when viewed from the display surface side.

3. The display device according to claim 2, further comprising:
a second heat sink that radiates heat generated by the light source; and
a retaining member that is provided between the first heat sink and the second heat sink and retains the optical system and the light source, wherein the retaining member is formed of a material having thermal conductivity smaller than thermal conductivity of a material forming the first heat sink and the second heat sink.

4. The display device according to claim 3, wherein
the first heat sink includes a first heat radiation fin,
the second heat sink includes a second heat radiation fin, and
a first plane parallel to a direction in which the first heat radiation fin extends and a second plane parallel to a direction in which the second heat radiation fin extends intersect with each other.

5. The display device according to claim 4, wherein the retaining member includes a cover that covers an end close to the second heat sink of the first heat sink.

6. The display device according to claim 5, further comprising:
a first mirror;
a second mirror; and
a housing that accommodates the first mirror and the second mirror,
wherein the first heat sink is disposed so as to be exposed to an outside of the housing.

7. A display device comprising:
a light source;
an optical system that converts light emitted from the light source into irradiation light that is to be an irradiation area having a predetermined width;
a liquid crystal panel that receives the irradiation light,
a first heat sink that includes an opening through which the irradiation light passes, and supports the liquid crystal panel,
a diffusion plate that diffuses the irradiation light,
a second heat sink that radiates heat generated by the light source; and
a retaining member that is provided between the first heat sink and the second heat sink and retains the optical system and the light source,
wherein the first heat sink is in contact with the liquid crystal panel,
wherein the first heat sink includes a first surface that is in contact with the liquid crystal panel and a second surface that is formed at a position closer to the opening than the first surface is when viewed from a display surface side of the liquid crystal panel and is formed at a position recessed in a direction separating from the liquid crystal panel,
wherein the diffusion plate is disposed between the second surface and the liquid crystal panel, and
wherein the retaining member is formed of a material having thermal conductivity smaller than thermal conductivity of a material forming the first heat sink and the second heat sink.

8. The display device according to claim 7, wherein
the first heat sink includes a first heat radiation fin,
the second heat sink includes a second heat radiation fin, and
a first plane parallel to a direction in which the first heat radiation fin extends and a second plane parallel to a direction in which the second heat radiation fin extends intersect with each other.

9. The display device according to claim 8, wherein the retaining member includes a cover that covers an end close to the second heat sink of the first heat sink.

10. The display device according to claim 9, further comprising:
a first mirror;
a second mirror; and
a housing that accommodates the first mirror and the second mirror,
wherein the first heat sink is disposed so as to be exposed to an outside of the housing.

11. A display device comprising:
a light source;
an optical system that converts light emitted from the light source into irradiation light that is to be an irradiation area having a predetermined width;
a liquid crystal panel that receives the irradiation light,
a first heat sink that includes an opening through which the irradiation light passes, and supports the liquid crystal panel,
a diffusion plate that diffuses the irradiation light,
a second heat sink that radiates heat generated by the light source; and
a retaining member that is provided between the first heat sink and the second heat sink and retains the optical system and the light source,
wherein the first heat sink is in contact with the liquid crystal panel,
wherein the first heat sink includes a first surface that is in contact with the liquid crystal panel and a second surface that is formed at a position closer to the opening than the first surface is when viewed from a display surface side of the liquid crystal panel and is formed at a position recessed in a direction separating from the liquid crystal panel,
wherein the diffusion plate is disposed between the second surface and the liquid crystal panel,
wherein the retaining member is formed of a material having thermal conductivity smaller than thermal conductivity of a material forming the first heat sink and the second heat sink, and
wherein the retaining member includes a cover that covers an end close to the second heat sink of the first heat sink.

12. The display device according to claim 11, further comprising:
a first mirror;
a second mirror; and
a housing that accommodates the first mirror and the second mirror,
wherein the first heat sink is disposed so as to be exposed to an outside of the housing.

* * * * *